March 31, 1964   R. S. OWENS ETAL   3,127,224
BEARING
Filed Nov. 20, 1961

Inventors:
Robert S. Owens;
Robert V. Klint,
by James J. Lichiello
His Attorney.

United States Patent Office 3,127,224
Patented Mar. 31, 1964

3,127,224
BEARING
Robert S. Owens, Watervliet, and Robert V. Klint, Rexford, N.Y., assignors to General Electric Company, a corporation of New York
Filed Nov. 20, 1961, Ser. No. 153,424
9 Claims. (Cl. 308—240)

This invention relates to bearing lubrication and bearing structure, and more particularly to dry lubricant materials incorporated in a very hard supporting structure.

Dry lubricants for bearings including certain inorganic compounds, i.e., the sulfides, disulfides, selenides and tellurides of such metals as molybdenum, tungsten, titanium, uranium, zirconium, etc., and additionally, nylon, polytetrafluoroethylene, graphite, etc., have found extensive use in many bearing applications. Specifically, these lubricants are being employed in those applications where such high temperatures are present as to prohibit the use of oils and greases, or where high vacuum conditions also are detrimental to oils and greases. These lubricants are also very applicable for use in bearings subjected to heavy shock loadings. A particular desirable feature of a high performance bearing is a very hard shell or supporting medium which will withstand severe operating conditions such as high shock loading, high temperature, and general corrosive conditions. However, the combination of a very hard shell or supporting structure together with a dry lubricant is not easily attained because of the extreme problems associated with suitably attaching or maintaining a dry lubricant material on which a supporting medium.

Accordingly, it is an object of this invention to provide an improved bearing with a very hard supporting structure.

It is another object of this invention to provide an improved dry lubricant bearing utilizing a cemented carbide as a supporting shell or medium.

It is a further object of this invention to provide an etched cemented carbide supporting structure with an impregnated dry lubricant therein.

It is a further object of this invention to provide a dry lubricant impregnated bearing operative with wet type lubricants.

Figure 1:
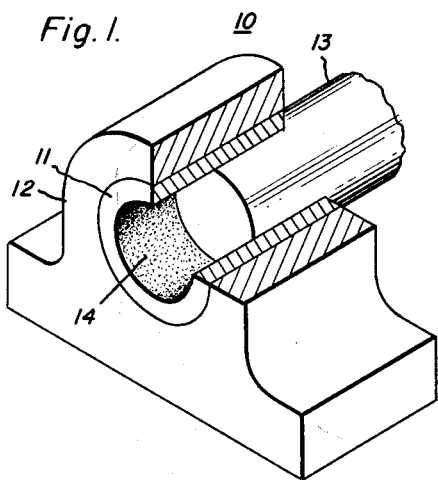

This invention will be better understood when taken in connection with the following description and drawing in which:

FIG. 1 is an illustration of a bearing assembly with appropriate sections to illustrate a bearing surface prepared according to the teachings of this invention.

Briefly described, this invention includes in one form a cemented carbide material which has been etched by an acid to remove surface portions of the cementing material, and a dry lubricant impregnated in the irregular voids and openings remaining after the etching process.

The product known as "cemented carbide" is one in which hard carbide particles are bonded in a softer matrix binding material, usually cobalt. Different degrees of hardness, density, strength, etc., are obtained by varying the component parts as well as the particle size or structure of the component. While tungsten is the main ingredient of Carboloy cemented carbides, in some instances, titanium and/or tantalum are used with tungsten to impart certain desirable properties to the material. In the manufacturing process of Carboloy cemented carbides, tungsten powder is intimately mixed with carbon and carburized at elevated temperatures. The carburized tungsten is then mixed with a binder material such as cobalt and is subsequently pressed into desired shapes, sizes, etc. These shapes are, in turn, subjected to predetermined temperatures in a controlled atmosphere or vacuum furnace and the material then has a chalk-like consistency in which state preforming operations can be performed with conventional machine tools. This so called pre-sintered material is then fully sintered and assumes the well known characteristics of extreme hardness, density, and high strength. Carboloy is a trade name of cemented carbides produced by General Electric Company. A hard material such as a cemented carbide is a very desirable material to be utilized as a bearing because of its high strength characteristics. The high resistance to wear, temperatures, shock and corrosion provides this material with desirable characteristics as a bearing support.

A bearing support or structure is best described in relation to FIG. 1 illustrating a well known type of sleeve bearing 10. In FIG. 1, the bearing assembly 10 includes a sleeve bearing insert 11 positioned in an apparatus 12 and adapted to support a shaft 13 therein for rotation. Shaft 13 is shown partially removed from sleeve 11 to illustrate surface preparation. The insert 11 is the supporting medium or structure as described in this invention. Usually such a sleeve 11 is of a soft material such as various combinations of brasses, bronze, babbitt, etc., and operates in conjunction with wet or oil and grease type lubrication. In the instant invention sleeve 11 comprises a very hard material in the form of a cemented carbide. The use of a cemented carbide sleeve under conventional or oil lubrication for example will perform satisfactorily in the hydrodynamic range. This range, in a well designed bearing is the operating range of the bearing where the shaft 13 for example is supported by an oil film. Starting and stopping conditions subject the bearing, particularly the sleeve 11 and shaft 13 to severe conditions of marginal lubrication where metal to metal contact between sleeve 11 and shaft 13 takes place. This is decidedly detrimental to the bearing structure because the cemented carbide, being of such a hard material will cause appreciable wear of the shaft 13, which is ordinarily the reverse condition of soft material sleeve bearings. Therefore, the use of cemented carbides as the sleeve 11 material requires constant lubrication at all times, a type of lubrication which may be obtained by the use of dry lubricants. However, it is very difficult to utilize a cemented carbide in conjunction with a dry lubricant material because these materials are difficult to attach or bond to a hard material such as a cemented carbide to provide optimum conditions of dry lubrication. It is a desirable feature that the attachment be by means of the dry lubricant material itself rather than by the addition of another bonding or binder material which may be less effective as a lubricant than the dry lubricant material thus providing less than maximum lubrication conditions or conditions more dependent on the binder material rather than the lubricant material. Specifically, for example $MoS_2$ which is one preferred lubricant is quite difficult to apply or attach to any hard metal surface because it does not penetrate the metal surface or have an attaching affinity for a cemented carbide surface for example, which is also a preferred surface. In some applications, therefore, in the absence of specific attachment, the means to provide a constant replenishment of dry lubricant on such a surface presents economic and physical problems which preclude the use of such a bearing.

It has been discovered that a cemented carbide may be suitably prepared so that a dry lubricant material may be impregnated in the carbide with excellent attachment features. More specifically, it has been discovered that a cemented carbide after having been etched in an acid solution to remove the binder material, which is ordinarily cobalt, provides a surface having a great many etch marks, pits, cavities and irregular openings in the surface thereof. These openings, generally, may be suitably impregnated or filled with a dry lubricant. Because of the high concentration of irregularities in internal surfaces as provided by etching, the $MoS_2$ dry lubricant material is mechanically attached to the surface and is maintained thereon and therein.

In exemplary applications of the teachings of this invention, flat discs of cemented carbides were run in a friction dynamometer. The test consisted of sliding a 3/16" high carbon chrome alloy ball against the treated surface under known loads and measuring the coefficient of friction. The specimens used were flat discs, of various grades of carbides, 1 5/8" in diameter and 1/8" thick. One face of the disc was etched for a period of 10-20 hours in a 1:1 solution of hydrochloric acid. The particular chemical composition of the various grades of cemented carbides as utilized in these tests are listed below in Table I.

Table I

Carboloy cemented carbide,

| Grade: | Composition, percent |
|---|---|
| 608 | $CrC_2$—83. W—2. Ni—15. |
| 55B | WC—84. Co—16. |
| 883 | WC—94. Co—6. |

The specimens were cleaned in trichlorethylene and heated in an atmosphere of 150° C. for about one hour. $MoS_2$ and $WS_2$ were applied from a pressed pellet of the powdered material sliding against the specimens under a 3 kilogram load. A 3/16" diameter high carbon chrome alloy ball was then substituted for the pellet for sliding against the specimens under various loads at a constant 100 r.p.m. The results appear in Table II as follows:

Table II.—Friction Dynamometer

CEMENTED CARBIDES—FLAT DISCS

| Grade | Surface Treatment | Lubricant | Load (kg.) | Coef. of Friction |
|---|---|---|---|---|
| 608 | Etched | $MoS_2$ | 1 | 0.05 |
| | | | 2 | 0.048 |
| | | | 3 | 0.004 |
| | | | 4 | 0.040 |
| | | | 5 | 0.036 |
| | | | 6 | 0.034 |
| 608 | Not Etched | $MoS_2$ | 1 | 0.154 |
| | | | 1.5 | 0.13 |
| | | | 1.8 | 0.154 |
| 55B | Etched | $MoS_2$ | 1 | 0.076 |
| | | | 2 | 0.069 |
| | | | 3 | 0.072 |
| | | | 4 | 0.060 |
| | | | 5 | 0.051 |
| | | | 6 | 0.045 |
| | | | 7 | 0.038 |
| 55B | Not Etched | None | .05 | 0.36 |
| | | | .5 | 0.76 |
| | | | 1.0 | 0.58 |
| 55B | Etched | ...do... | .05 | 0.47 |
| | | | .3 | 0.86 |
| | | | 1.0 | 0.63 |
| 883 | ...do... | $WS_2$ | 1 | 0.048 |
| | | | 2 | 0.071 |
| | | | 3 | 0.056 |
| | | | 4 | 0.041 |
| | | | 5 | 0.033 |
| | | | 6 | 0.04 |
| 883 | Not Etched | $WS_2$ | 1 | 0.095 |
| | | | 2 | 0.110 |
| | | | 3 | 0.165 |
| | | | *1 | 0.038 |
| 883 | Etched | $WS_2$ | 2 | 0.065 |
| | | | 3 | 0.065 |
| | | | 4 | 0.043 |
| | | | 5 | 0.046 |
| | | | 6 | 0.047 |
| | | | 7 | 0.047 |

*This test was run using a 1/8" diameter steel ball.

As can be seen from the above examples, etching has a profound effect on the durability of a solid lubricant film. Although the data indicates that the composition of the carbide had little effect on the coefficient of friction, a track of solid lubricant appeared to form more readily on the high cobalt specimens (55B-883). This was probably due to the fact that the acid could etch out relatively larger irregular pockets resulting in a better anchorage for the solid lubricant. Low coefficients of friction were observed even after several hours at high loads.

The lubrication and operating conditions as indicated in Table II are those strenuous conditions usually associated with marginal lubrication or boundary conditions such as upon starting and stopping. A bearing would be within these boundary conditions only short periods of time. However, it is this feature of marginal lubrication on starting and stopping which is a decided hindrance to the use of carbides as bearing elements. It is thus understood that the process of this invention provides a carbide bearing having excellent lubricating characteristics under marginal conditions. Therefore, the bearing may be employed with dry lubricant only since ordinary continuous operation presents no problem. Effectively however, the invention has eliminated the marginal lubricating conditions in a hydrodynamic bearing, i.e., one lubricated with wet or fluid lubricants for example, liquids, gases, oils, greases, etc.

In order to further show the effectiveness of the teachings of this invention, a 1/2" shaft of Carboloy cemented carbide grade 883 was etched for 16 hours in a 1:1 HCl solution. $MoS_2$ was then rubbed on the rotating shaft from a pellet and a toroidal bearing or sleeve was employed. Utilizing a bearing having a configuration of a toroid provides a bearing area, when operating with a shaft, of essentially line contact. The bearing load was 2.5 lbs. and the speed of the shaft was increased to 1100 r.p.m. Over this range the coefficient of friction remained at about 0.01.

Because of the hot hardness properties of the cemented carbides and the high temperature stability of the molybdenum disulfide, a bearing prepared in accordance to the teachings of this invention is quite useful in high temperature bearing applications with a dry lubricant only, or in low pressure or vacuum environment.

Other than bearing applications may be included in the teachings of this invention. The teachings of this invention are equally applicable to rolling contact bearings such as the well known ball and roller types. Additionally for example, a cemented carbide metal cutting tool may be treated and impregnated with a dry lubricant material for more efficient cutting properties in the metal cutting art.

Figure 2:
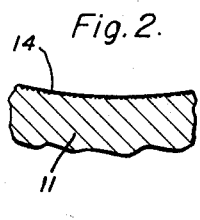

FIG. 2 is a cross sectional view of a portion of sleeve 11 illustrating the etched surfaces and a dry lubricant 14 impregnated therein.

While a specific method and apparatus in accordance with this invention is described and shown, it is not desired that the invention be limited to the particular description nor to the particular configurations illustrated, and it is intended by the appended claims to cover all modifications within the spirit and scope of this invention.

What we claim as new and desire to secure by Letters Patent of the United States is:

1. An article of manufacture comprising in combination, a composite body of a very hard metal including tungsten and a metallic binder, adapted to contact a further body and have relative motion therewith, said composite body being further characterized by having surface portions of said binder etched to leave irregular surface openings into said body, and a dry lubricant material in said openings to provide lubrication between said composite body and said further body.

2. An article of manufacture comprising in combination, a composite body of a cemented tungsten carbide adapted to contact a further body and have relative motion therewith, said cemented carbide body being further characterized by having surface portions of the cementing metal thereof etched away to leave irregular surface openings into said body, and a dry lubricant material in said openings to provide lubrication between said composite body and said further body.

3. An article of manufacture comprising in combination, a cemented tungsten carbide body utilizing a cobalt binder metal and adapted to contact a further body and have relative motion therewith, said carbide body being further characterized by having surface portions of said cobalt binder acid etched to leave irregular surface openings into said body, and a dry lubricant material in said openings to provide lubrication between said composite body and said further body.

4. A bearing comprising in combination, a cobalt cemented tungsten carbide element having the surface cobalt portions acid etched to provide irregular surface openings into said carbide element, and a dry lubricant material impregnated in said openings to provide lubrication between said carbide element and a further element in contact with said carbide element with relative motion therebetween.

5. The invention as described in claim 4 wherein said dry lubricant is $MoS_2$.

6. The invention as recited in claim 4 wherein said dry lubricant is $WS_2$.

7. A hydrodynamic bearing comprising in combination, a cobalt cemented tungsten carbide element having surface cobalt portions acid etched to provide irregular surface openings into said carbide element, and a dry lubricant material impregnated in said openings to provide lubrication in addition to hydrodynamic lubrication between said carbide element and a further element in contact with said carbide element with relative motion therebetween.

8. A method of preparing a cobalt cemented tungsten carbide material for us in sliding contact with a further member comprising acid leaching the cobalt on the surface of said carbide, and impregnating the leached openings with a dry lubricant material taken from the class consisting of $MoS_2$ and $WS_2$.

9. A method of preparing a cobalt cemented carbide element for use in sliding contact with a further member which comprises, treating the said cemented carbide with a 1:1 HCl solution to leach out surface portions of the cobalt to provide irregular surface openings into said carbide, applying $MoS_2$ dry lubricant to said surface by rubbing a pellet of $MoS_2$ thereon to fill said irregular surface openings with $MoS_2$.

References Cited in the file of this patent

UNITED STATES PATENTS

| | | |
|---|---|---|
| 1,843,768 | Hoyt | Feb. 2, 1932 |
| 2,248,530 | Granger et al. | July 8, 1941 |
| 2,517,430 | Hensel et al. | Aug. 1, 1950 |
| 2,893,793 | Ryshavy | July 7, 1959 |
| 2,901,380 | Crump | Aug. 25, 1959 |